United States Patent [19]

Kampe et al.

[11] Patent Number: 5,666,657

[45] Date of Patent: Sep. 9, 1997

[54] METHOD IN A SELECTIVE CALL RECEIVER FOR APPLYING CONDITIONAL PARTIAL ADDRESS CORRELATION TO A MESSAGE

[75] Inventors: Frederick L. Kampe, Boynton Beach, Fla.; John K. Gleeson, Beijing, China

[73] Assignee: Motorola, Inc., Schaumburg, Ill.

[21] Appl. No.: 646,736

[22] Filed: May 3, 1996

[51] Int. Cl.⁶ .................................................. H04B 7/00
[52] U.S. Cl. ............... 455/38.3; 455/343; 340/311.1; 340/825.44
[58] Field of Search ........................ 455/38.3, 38.1, 455/343; 340/311.1, 333, 693, 825.44–825.48

[56] References Cited

U.S. PATENT DOCUMENTS

| | | | |
|---|---|---|---|
| 4,996,526 | 2/1991 | DeLuca | 340/825.44 |
| 5,376,975 | 12/1994 | Romero et al. | 340/825.44 |
| 5,493,282 | 2/1996 | Petreye et al. | 340/825.27 |

*Primary Examiner*—Donnie L. Crosland
*Attorney, Agent, or Firm*—John H. Moore; Eduardo Guntin

[57] ABSTRACT

A selective call receiver (100) uses a method of partial address correlation to decode a portion of a selective call signal transmitted by a radio communication system so as to reduce energy consumption of the selective call receiver (100). The selective call receiver (100) is programmed to receive the portion of the selective call signal from the radio communication system, determine a first probable energy $E_1$ that would be dissipated by the selective call receiver if it were to use partial address correlation, and compare the first probable energy $E_1$ to a second probable energy $E_2$ that would be dissipated by the selective call receiver if it did not use partial address correlation. If $E_1$ is less than $E_2$, then partial address correlation is used.

14 Claims, 5 Drawing Sheets

5,666,657

1

METHOD IN A SELECTIVE CALL RECEIVER FOR APPLYING CONDITIONAL PARTIAL ADDRESS CORRELATION TO A MESSAGE

FIELD OF THE INVENTION

This invention relates in general to selective call receivers, and in particular to a selective call receiver applying partial address correlation to conserve battery life.

BACKGROUND OF THE INVENTION

Some conventional selective call receivers apply partial address correlation on all intercepted messages transmitted by a radio communication system in order to extend the battery life of the selective call receiver. Partial address correlation is performed by collecting a portion of the address field included in an intercepted message, and determining if the portion of the address field possibly matches with any number of predetermined selective call addresses stored in the selective call receiver. An address match is determined from a partial address match of less than a predetermined number of bit differences. If a partial address match is found, the selective call receiver intercepts the complete message. If a partial address match is not found, the receiver circuit is shutdown early to conserve energy and extend battery life.

Although partial address correlation generally requires additional processing resources, partial address correlation produces a net energy savings when compared to traditional address decoding schemes that maintain the receiver circuit on for the duration of the address field. This is because the energy consumed by the receiver circuit is a significant portion of the overall energy consumed by the selective call receiver. Thus, early shutdown of the receiver circuit provides substantial energy conservation, thereby extending battery life.

Partial address correlation provides battery life savings in cases where the number of selective call addresses stored in the selective call receiver is small and the data included in the intercepted messages is random. Each of these cases result battery life savings, because the overall probability that the selective call receiver will find a partial address match is low, and the likelihood of early receiver circuit shutdown is high.

However, as the number of selective call addresses is increased the probability of finding a partial address match increases, and the number of occurrences of early receiver circuit shutdown is reduced. Moreover, a higher number of selective call addresses results in a greater number of address comparisons, which increases the processing time for performing partial address correlation.

The less frequent shutdown of the receiver circuit combined with higher processing time diminishes the savings obtained from the application of partial address correlation. In addition, for a high number of address comparisons, a point is reached where the selective call receiver consumes more energy (on average) when applying partial address correlation than if traditional address decoding is used.

Thus, what is needed is a method and apparatus that can improve the battery life savings of selective call receivers applying partial address correlation.

2

Figure 1:
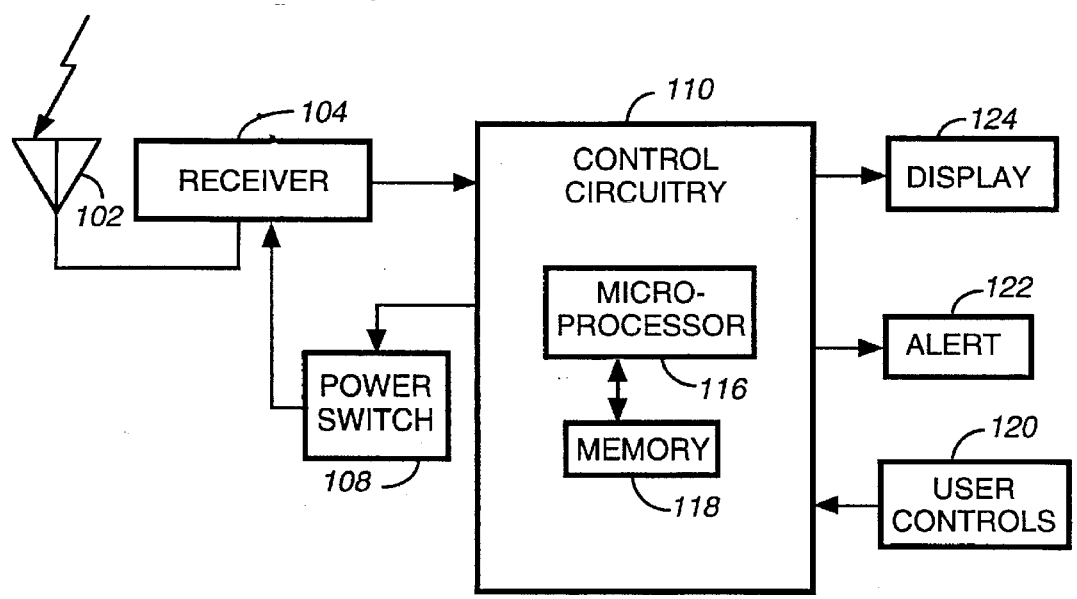
FIG. 1 is an electrical block diagram of a selective call receiver according to the present invention.
Figure 2:
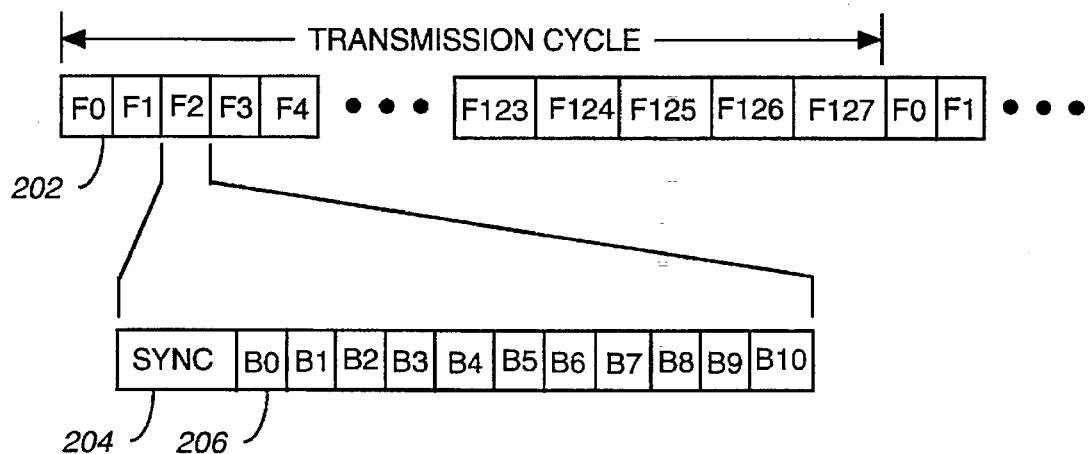
Figure 3:
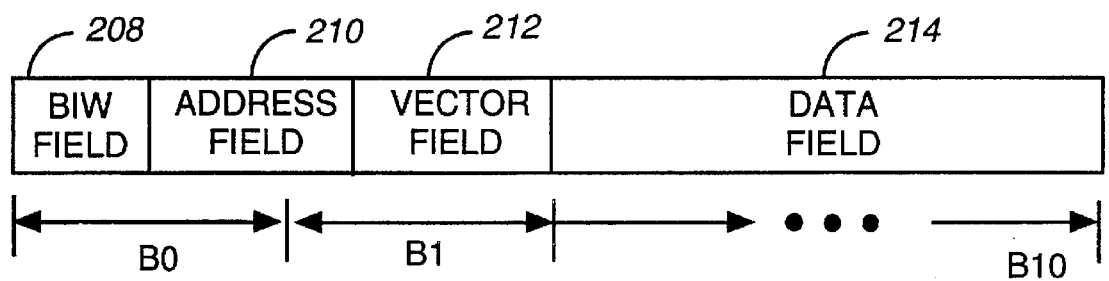
Figure 4:
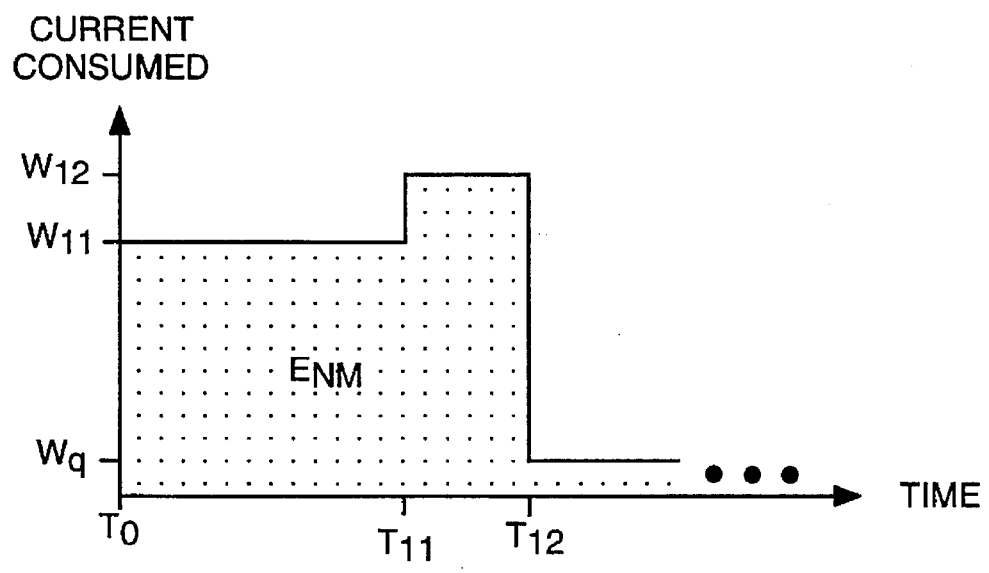
Figure 5:
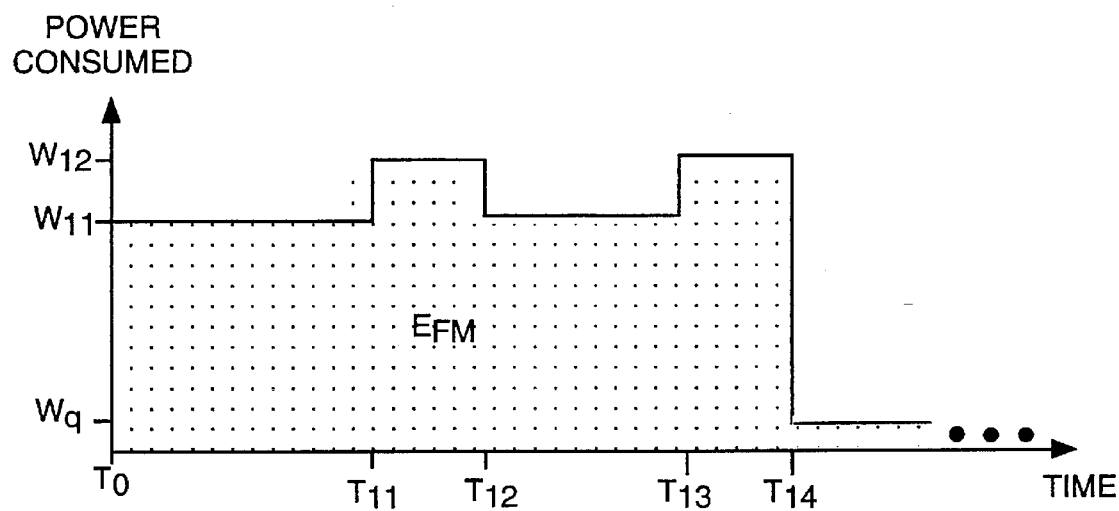
Figure 6:
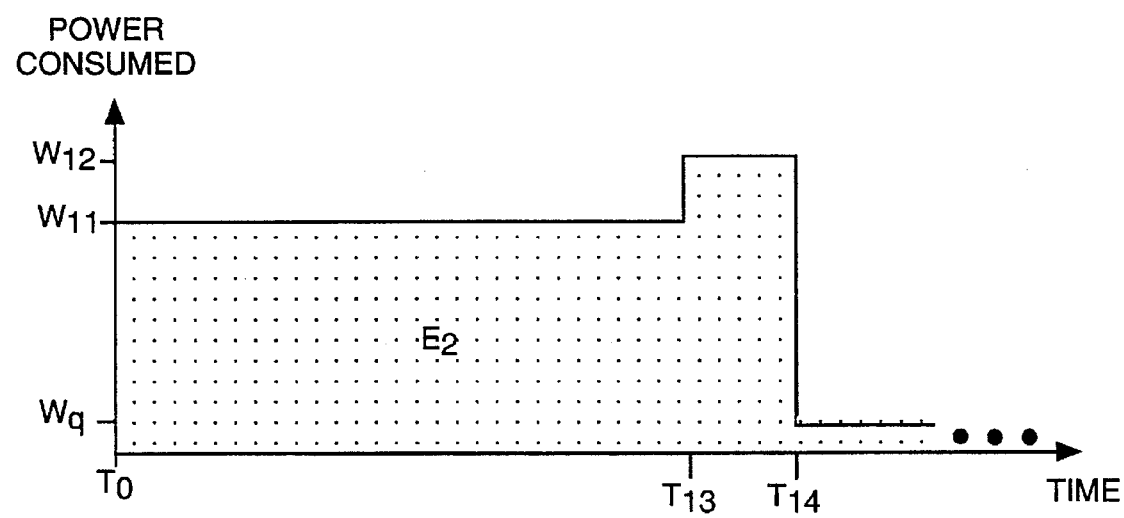
Figure 7:
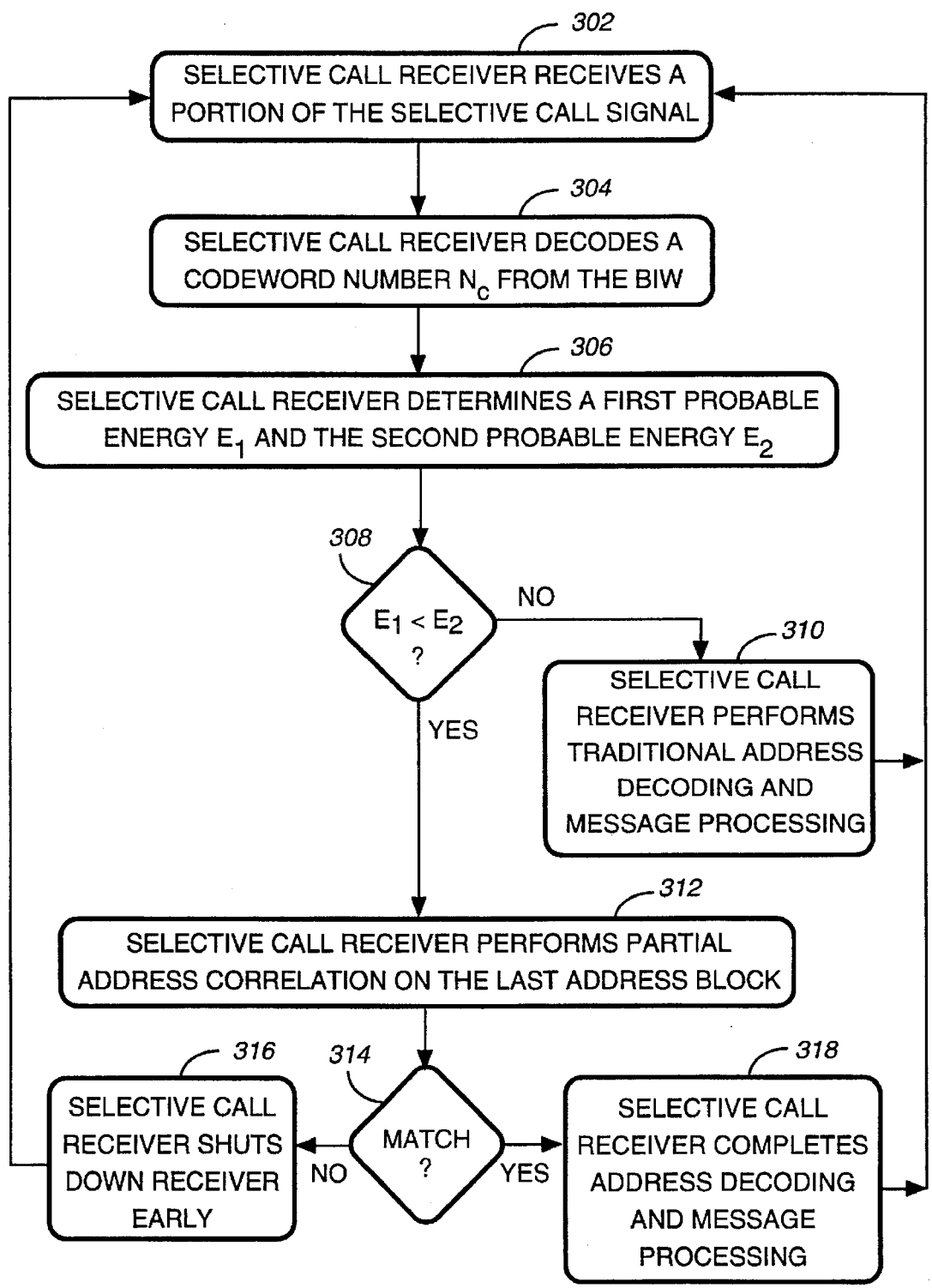
Figure 8:
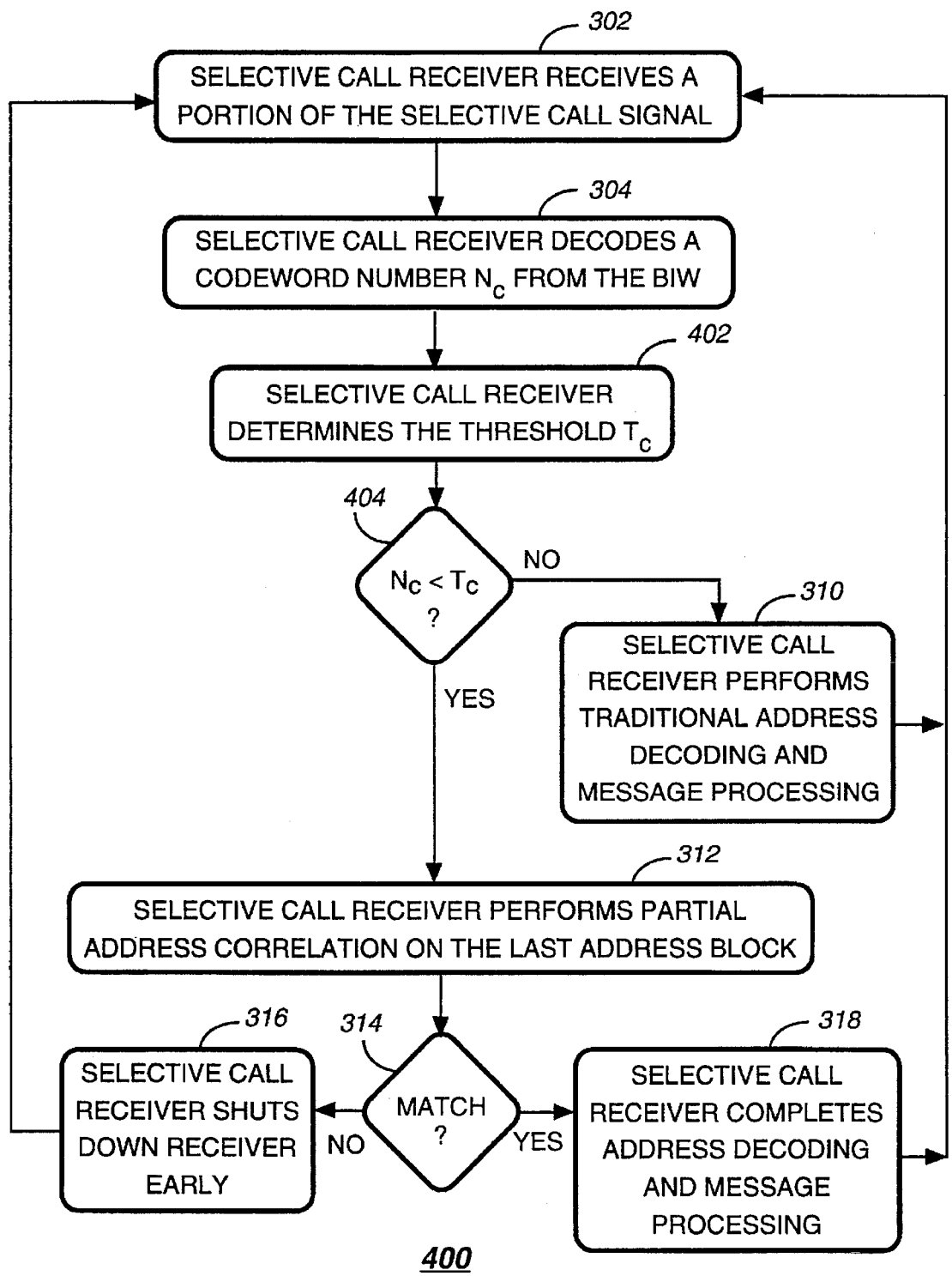

FIG. 2 is a timing diagram depicting a communication protocol used by the selective call receiver of FIG. 1;

FIG. 3 is a timing diagram depicting the elements of a synchronous frame of the communication protocol of FIG. 2;

FIG. 4 is a diagram depicting an energy $E_{NM}$ that would be dissipated when the selective call receiver utilizing partial address correlation detects no partial address match;

FIG. 5 is a diagram depicting an energy $E_{FM}$ that would be dissipated when the selective call receiver utilizing partial address correlation detects a partial address match;

FIG. 6 is a diagram depicting a second probable energy $E_2$ that would be dissipated by the selective call receiver if it did not use partial address correlation;

FIG. 7 is a flow chart showing the operation of conditional partial address correlation in the selective call receiver according to a first embodiment of the present invention; and FIG. 8 is a flow chart showing the operation of conditional partial address correlation in the selective call receiver according to a second embodiment of the present invention.

DESCRIPTION OF THE PREFERRED EMBODIMENT

FIG. 1 is an electrical block diagram of a selective call receiver 100 according to the present invention. The selective call receiver 100 receives selective call signals, composed of selective call messages, transmitted by a radio communication system (not shown). The selective call messages are originated by a caller who communicates with the radio communication system in a conventional manner to send messages intended for the user of the selective call receiver 100. Messages intercepted by the selective call receiver 100 are decoded with conditional partial address correlation in accordance with the present invention. Conditional partial address correlation is asserted only when the probability of its assertion results in overall energy conservation for the selective call receiver 100. The details of conditional partial address correlation is described below.

The selective call receiver 100 comprises a receiver antenna 102, a receiver 104, a power switch 108, a control circuitry 110, user controls 120, an alerting device 122, and a display 124.

The receiver antenna 102 is coupled to the receiver 104 for receiving a portion of the selective call signal transmitted by the radio communication system. The receiver antenna 102 and the receiver 104 utilize conventional hardware for demodulating the selective call signal, which is modulated by the radio communication system with, for example, frequency shift keying techniques.

The receiver 104 is also coupled to the power switch 108 and the control circuitry 110. The power switch 108 utilizes a conventional circuit element such as, for example, a MOS switch for shutting down power to the receiver 104. Operation of the power switch 108 is controlled by the control circuitry 110, which determines at particular moments during the decoding process of the selective call signal when shutdown of the receiver 104 is appropriate. A shutdown of the receiver 104 prior to the completion of a portion of the selective call signal provides a battery saving function.

The control circuitry 110 controls the overall operations of the selective call receiver 100. One such operation is the decoding of the demodulated signal generated by the receiver 104. This operation is accomplished by rite elements of the control circuitry 110, which include a microprocessor 116, and a memory 118. The microprocessor 116 is similar to the M68HC08 micro-controller manufactured by Motorola, Inc. It will be appreciated that other similar processors can be utilized for the microprocessor 116, and that additional processors of the same or alternative type can be added as required to handle the processing requirements of the microprocessor 116.

The memory 118 includes a volatile memory section and a non-volatile memory section such as, for example, a random access memory (RAM), a read-only memory (ROM), and an electrically-erasable programmable read-only memory (EEPROM). It will be appreciated that other types of memory may be used such as, for example, FLASH memory. It will be further appreciated that the memory 118, singly or in combination, can be an integral portion of the microprocessor 116.

It will also be appreciated that, alternatively, some or all of the control circuitry 110 can be implemented with an application specific integrated circuit (ASIC) with hard-wired logic that processes selective call signals as will be described below.

Once the control circuitry 110 has processed a selective call message, the selective call message is stored in the memory 118, and a call alerting signal is generated to alert a user that the selective call message has been received. The call alerting signal is directed to a conventional audible, visible or tactile alerting device 122 for generating an audible, visible or tactile call alerting signal. The selective call message can be accessed by the user through user controls 120, which provide functions such as lock, unlock, delete, read, etc. More specifically, by the use of appropriate functions provided by the user controls 120, the message is recovered from the memory 118, and then displayed on the display 124. The display 124 is a conventional display such as, for example, a liquid crystal display (LCD).

FIG. 2 is a timing diagram depicting the communication protocol 200 that is preferably used by the radio communication system. This protocol, developed by Motorola, Inc., is known as the FLEX digital selective call signaling protocol (Flex is a trademark of Motorola, Inc.) that is presently used by various system operators in the United States and in several other countries. More details of the Flex protocol can be found in U.S. Pat. No. 5,371,737, assigned to Motorola, Inc. It will be appreciated that other communication protocols that are suitable to this invention can be used. However, in the discussion below it is assumed that the Flex protocol is used.

The communication protocol 200 comprises a plurality of synchronous frames 202 (shown as F0, F1, F2, . . . , F127, by way of example). The data transmitted by the communication protocol 200 can be multiplexed in 1, 2 or 4 bit streams. The frames are transmitted during a periodically occurring time span corresponding to a transmission cycle which has a predetermined duration (e.g., 4 minutes), and which includes a predetermined number of frames (e.g., 128 frames). Each frame corresponds to a predetermined time interval (e.g., 1.875 seconds), and includes an outbound sync 204, and a plurality of information blocks 206 (shown as B0, B1, B2, . . . , B10, by way of example). The outbound sync 204 is used by the selective call receiver 100 as a means for bit synchronization utilizing techniques well known in the art. The information blocks 206 contain data that is interleaved to provide additional protection from signal fading and burst errors.

The information blocks 206 include digital data such as shown in FIG. 3. Block 0 (B0) begins with a block information word (BIW) field 208, and is followed by an address field 210, a vector field 212, and a data field 214. The BIW field 208 provides information such as, for example, the periodicity of message monitoring (or collapse rate) to be performed by the selective call receiver 100, and the number of selective call address included in the address field 210. The vector field 212 includes one or more message vectors which point to a time within the signaling format of the communication protocol 200 corresponding to the position of one or more selective call messages included in the data field 214 intended to be intercepted by one or more selective call receivers 100.

As depicted in FIG. 3, information block 0 begins with the BIW field 208. The variable length of the BIW field 208, the address field 210, the vector field 212 and the data field 214 creates situations where sections of the information blocks 206 overlap with more than one field. In this example, portions of the address field 210 overlap blocks 0 and 1 (B0, B1). As will be described below, this apportionment determines the time when partial address correlation is applied by the selective call receiver 100.

FIGS. 4 and 5 depict energy distributions which are used by the selective call receiver 100 for determining when to apply conditional partial address correlation on the selective call signal. The application of conditional partial address correlation requires the selective call receiver 100 to determine a first probable energy $E_1$ that would be dissipated by the selective call receiver 100 if it were to use partial address correlation for decoding a portion of the address field 210, and a second probable energy $E_2$ that would be dissipated by the selective call receiver 100 if it did not use partial address correlation. In the latter case, the selective call receiver 100 deinterleaves, error corrects, and decodes the entire address field 210 using traditional address decoding schemes, which match bit-for-bit every selective call address stored in the selective call receiver 100 with every selective call address received in the selective call signal.

FIG. 4 is a diagram depicting an energy $E_{NM}$ that would be dissipated when the selective call receiver 100 utilizing partial address correlation detects no partial address match. Partial address correlation is preferably applied on the last information block 206 (e.g., block 1) where the address field 210 terminates. Although partial address correlation can be applied on all information blocks 206, the benefits gained are small, because of the warm-up time of the receiver 104. Thus, the energy depicted in FIG. 4 corresponds to the application of partial address correlation on the last information block 206 (i.e., block 1) corresponding to the example of FIG. 3.

From time $T_o$ up to time $T_{11}$, the receiver 104 receives and deinterleaves the first half of the remaining addresses in block 1. This period is approximately 80 ms and comprises 16 address bits (i.e., half of 32 address bits included in the remaining portion of addresses). During this period, the selective call receiver 100 dissipates a power designated by $W_{11}$.

Beginning at $T_{11}$ the control circuitry 110 begins to perform partial address correlation looking for a partial address match. During partial address correlation the selective call receiver 100 dissipates a power designated by $W_{12}$. If no partial address match is detected by the time $T_{12}$, as in this example, the control circuitry 110 shuts down the receiver 104 and all non-essential circuits placing the selective call receiver 100 in sleep-mode. During sleep-mode the selective call receiver 100 dissipates a quiescent power designated by $W_q$.

The energy $E_{NM}$ dissipated by the selective call receiver 100 is determined from calculating the area under the curve of FIG. 4. This area is calculated by simple piece-wise linear approximations of each rectangular portion of the curve starting at time $T_o$ up to time $T_{12}$.

FIG. 5 is a diagram depicting an energy $E_{FM}$ that would be dissipated when the selective call receiver 100 utilizing partial address correlation detects a partial address match. The diagram for FIG. 5 is substantially similar to the diagram of FIG. 4 with the exception that FIG. 5 continues processing after $T_{12}$. When a partial address match is detected, the selective call receiver 100 proceeds to process the selective call signal. From time $T_{12}$ up to time $T_{13}$, the receiver 104 receives and deinterleaves the second half of the remaining address bits in block 1. This period is approximately 80 ms and comprises the remaining 16 address bits (i.e., the second half of the 32 address bits included in the remaining portion of selective call addresses).

The power dissipated during this period remains at $W_{11}$. From time T13 up to time T14 the selective call receiver 100 deinterleaves, error corrects and processes the remaining portion of the address field 210. During this period the selective call receiver 100 dissipates the power $W_{12}$. The energy $E_{FM}$ is determined in the same manner as in FIG. 4.

FIG. 6 is a diagram depicting a second probable energy $E_2$ that would be dissipated by the selective call receiver 100 if it did not use partial address correlation. When applying traditional address decoding to the remaining addresses in block 1, the selective call receiver 100 first receives all 32 address bits of the remaining addresses in block 1. The 32 address bits are received during the period starting at time To and ending at time $T_{13}$. This period is approximately 160 ms. During this period the selective call receiver 100 dissipates the power $W_{11}$. Starting at T13 and ending at time $T_{14}$, the selective call receiver 100 deinterleaves, error corrects and processes the 32 address bits of each selective call address received. The power dissipated during this time is $W_{12}$. The energy $E_2$ is determined as described in FIG. 4.

It is apparent from FIGS. 5 and 6 that when the selective call receiver 100 applies partial address correlation, and a partial address match is detected that the selective call receiver 100 dissipates more energy than the energy dissipated when applying traditional address decoding methods. It is also apparent that a significant amount of energy can be conserved when partial address correlation does not detect a partial address. In contrast, when the probability of detecting a partial address match is high, the selective call receiver 100 will dissipate more energy when partial address correlation is applied.

To prevent this situation, the present invention conditionally applies partial address correlation based on the probability of a partial address match. That is, when the probability of a partial address match is high, the selective call receiver 100 applies traditional address decoding, while when the probability of a partial address match is low, the selective call receiver 100 applies partial address correlation to conserve energy.

FIGS. 7 and 8 provide two embodiments for conditional partial address correlation. These methods conditionally assert partial address correlation based on the probability that there will not be a partial address match between the selective call addresses included in the address field 210, and the predetermined selective call addresses stored in the memory 118 of the selective call receiver 100.

FIG. 7 is a flow chart 300 showing the operation of conditional partial address correlation in the selective call receiver 100 according to a first embodiment of the present invention. Instructions that correspond to the steps shown in the flow chart 300 are stored in the memory 118 of the selective call receiver 100, or are alternatively hardwired into the state machine of an ASIC.

The flow chart 300 begins with step 302 where the selective call receiver 100 receives a portion of the selective call signal. In step 304 the selective call receiver 100 calculates a number $N_c$ from the BIW field 208, which reports the number of selective call address codewords included in the address field 210. It will be appreciated that when the entire address field 210 is included in the first information block 206, then $N_c$ is calculated from the frame information word (FIW) included in the outbound sync 204. In step 306 the selective call receiver 100 determines the first probable energy $E_1$ that would be dissipated by the selective call receiver 100 if it were to use partial address correlation, and the second probable energy $E_2$ that would be dissipated by the selective call receiver 100 if it used traditional address decoding.

The first probable energy $E_1$ is based on a probability $P_{NM}$ of not finding a substantial match between one of $N_a$ selective call addresses and one of $N_c$ selective call address codewords. The number $N_a$ is a predetermined number of selective call addresses stored in the memory 118 of the selective call receiver 100. To determine the probability $P_{NM}$ of not finding an address match, the selective call receiver 100 calculates a number R corresponding to the number of random address bits in the selective call addresses stored in the memory 118.

Each selective call address stored in the memory 118 may be assigned a different collapse rate, base frame number, and phase in the selective call signal transmitted by the radio communication system. Typically, the base frame and phase numbers are included in the 32 bit address patterns assigned to the selective call receiver 100. In order to determine the effective number of random address bits R in the address codewords received from the selective call signal, the number of bits used by the collapse rate, and the phase number must be discounted from the total number of partial address bits (e.g., 16 bits) processed by partial address correlation.

In the case of a four phase selective call receiver 100, the phase bits are considered random, while the phase bits used by a single phase selective call receiver 100 are not considered random. This is because the phase bits in a single phase selective call receiver 100 are used to identify a particular phase, while this information is not needed in a four phase selective call receiver 100 because all phases are monitored. Therefore, only in the case of single phase selective call receivers 100 will the phase bits be discounted from the total number of partial address bits.

Before discounting the number of bits used for the collapse rate, an effective collapse rate must be determined to account for the case of multiple collapse rates used by the stored addresses. For example, assume that the selective call receiver 100 is assigned three addresses. Assume that the stored addresses are assigned a collapse rate of 2, 4 and 5, respectively (i.e., messages are monitored periodically every 4, 16 and 32 frames, respectively). With these collapse rates, the selective call receiver 100 monitors a total of 44 frames in a transmission cycle (i.e., 128 frames every 4 minutes). Monitoring a total of 44 frames is effectively the same as monitoring messages every 2.9 frames (i.e., 44 divided by 128 frames per cycle). This effective collapse rate (i.e., $2^{Ceff}$) works out to 1.54 non-random bits (i.e., logarithm of 2.9 divided by the logarithm of 2).

Once the number of bits in the effective collapse rate has been determined, it is also discounted from the total number of partial address bits. The final result is the number R.

Once R has been determined, the probability $P_{NM}$ can be calculated from the relation $$P_{NM} = [P_{NM1}]^{N_c * N_a},$$

wherein $P_{NM1}$ is a probability of not finding an address match between a single selective call address stored in the selective call receiver 100, and any of the selective call addresses included in the address field 210. The product $N_c * N_a$ represents the worse case number of address comparisons needed to determine if there is an address match between the stored selective call addresses and the selective call addresses in the selective call signal The commutative product of $P_{NM1}$ for all these comparisons results in the probability of not finding an address match $P_{NM}$. The probability $P_{NM1}$ is determined from the relation $$P_{NM1} = 1 - \left( \frac{1}{2^R} * \sum_{x=0}^{B_e} \left( \frac{R!}{(R-x)!x!} \right) \right),$$

wherein $B_e$ is the number of correctable bit errors in the address portion of the selective call signal. Thus, the probability $P_{NM}$ takes the final form of $$P_{NM} = \left( 1 - \left( \frac{1}{2^R} * \sum_{x=0}^{B_e} \left( \frac{R!}{(R-x)!x!} \right) \right) \right)^{N_c * N_a}.$$

Note number R in this equation must be an integer. In cases where the number of bits in the effective collapse rate is non-integer, the number $P_{NM}$ should be interpolated from the closest integers to R. For example, for a value of R=12.2, a $P_{NM}$ value should be calculated for each of the numbers R=12 and R=13. The number $P_{NM}$ for R=12.2 can then be interpolated from the values of $P_{NM}$ for R=12 and R=13.

Once $P_{NM}$ has been determined, the first probable energy $E_1$ is determined from the relation $$E_1 = P_{NM} * E_{NM} + [1 - P_{NM}] * E_{FM},$$

wherein $E_{NM}$ is the energy dissipated by the selective call receiver 100 when no partial address match is found, and $E_{FM}$ is the energy dissipated by the selective call receiver 100 when an address match is found. Both $E_{NM}$ and $E_{FM}$ are determined empirically from the measured power consumption of the selective call receiver 100 as discussed in FIGS. 4 and 5. The second probable energy $E_2$ is also determined empirically and is preferably a predetermined constant stored in the memory 118 of the selective call receiver 100.

To best understand how these equations are applied, an example is presented. Assume that a selective call address is transmitted with 2 bit error correction, and that the selective call address has a net of 13 random partial address bits after taking into account the effective collapse rate (e.g., 3 bit), the phase number (e.g., 0 bits—applies to the case of a four phase selective call receiver 100). In this example, R=13 and $B_e$=2. By applying the above equation, it follows that the probability of not finding a single address match $P_{NM1}$ is approximately 98.87%. Further assume that a selective call receiver 100 has a single selective call address stored in the memory 118, and that the selective call receiver 100 receives a selective call signal with 15 selective call addresses all in block 0. Applying the above equation, the probability of not finding an address match $P_{NM}$ is 84.42%.

Also let the power of the control circuitry 110 when applying either partial address correlation or traditional address decoding equal 2 mW (milli-watts), and 10 mW for the receiver 104 while operating to receive the selective call signal. Assuming it takes 80 ms to receive the first half of the address bits, and 20 ms to determine that there is no partial address match, it follows that $E_{NM}$ is equal to 1.04 mW-s (milli-watt-seconds) (i.e., 10 mW*80 ms+12 mW*20 ms), assuming the quiescent power $W_q$ is negligible.

Assuming that it takes 80 ms to receive the first half of the address bits, 20 ms to detect a partial address, 60 ms to receive the second half of the address bits, and 20 ms to deinterleave, error correct and process the address, it follows that $E_{FM}$ is equal to 1.88 mW-s (i.e., 1.04 mW-s+10 mW*60 ms+12 mW*20 ms). Applying the above equation, the first probable energy $E_1$ is approximately 1.17 mW-s (i.e., 1.04 mW-s*84.4%+1.88 mW-s*15.6%).

Assuming also that it takes 160 ms to receive all 32 address bits and 20 ms to process when applying traditional address decoding, the second probable energy $E_2$ is approximately 1.84 mW-s (i.e., 10 mW*160 ms+12 mW*20 ms) Hence, the probable energy consumed by the selective call receiver 100 when applying traditional address decoding is approximately 57.5% greater than the probable energy consumed by the selective call receiver 100 when applying partial address correlation.

Once $E_1$ and $E_2$ have been determined, the selective call receiver 100 proceeds to step 308 where it compares the results of $E_1$ and $E_2$. If $E_1$ is greater than or equal to $E_2$ then the selective call receiver 100 proceeds to step 310 where traditional address decoding and message processing is performed. If, however, $E_1$ is less than $E_2$ then the selective call receiver 100 proceeds to step 312 where it performs partial address correlation on the last address block. (Based on the results of the above example, the selective call receiver 100 would proceed to step 312). In step 314 the selective call receiver 100 checks for a partial address match. If one is found, the selective call receiver 100 proceeds to step 318 where the selective call receiver 100 completes the address decoding and message processing. If no match is found, the selective call receiver 100 proceeds to step 316 where the receiver 104 is shutdown early prior to the completion of the remaining address bits of the address field 210. At the end of steps 310, 316, and 318 the selective call receiver 100 proceeds to step 302 to receive further messages.

It will be appreciated that, alternatively, step 306 can be replaced with a look up table step where the selective call receiver 100 is programmed to retrieve the values for $E_1$ and $E_2$ from the memory 118 of the selective call receiver 100. In this step the selective call receiver 100 reads $E_1$ from one of a plurality of predetermined probable energies stored in the memory 118. The selective call receiver 100 uses the product of $N_c * N_a$ as an index for selecting a corresponding first probable energy $E_1$ from the table. The plurality of first probable energies can be estimated from an empirical analysis of a population of selective call receivers 100 applying different numbers of address comparisons. The results can be programmed in the memory 118 of the selective call receivers 100 during the manufacturing process. The second probable energy $E_2$ is preferably a predetermined constant stored in the memory 118. This constant is determined, for example, empirically during the manufacturing process, and is programmed into the memory 118 at that time.

Once the selective call receiver 100 has read $E_1$ and $E_2$ from the memory 118, it proceeds to step 308 where the determination of conditional partial address correlation is made.

FIG. 8 is a flow chart 400 showing the operation of conditional partial address correlation in the selective call receiver 100 according to a second embodiment of the present invention. Instructions that correspond to the steps shown in the flow chart 400 are stored in the memory 118 of the selective call receiver 100, or are alternatively hardwired into the state machine of an ASIC.

This flow chart 400 is substantially similar to the flow chart 300 of FIG. 7, except that steps 306 and 308 are replaced with steps 402 and 404, respectively. In step 402 the selective call receiver 100 determines the number $T_c$ which represents a predetermined threshold of address comparisons. In step 404 the selective call receiver 100 compares the address codeword number $N_c$ calculated in step 304 with the threshold $T_c$. If $N_c$ is greater than or equal to $T_c$, then the selective call receiver 100 proceeds to step 310 where traditional address decoding is applied. If $N_c$ is less than $T_c$, then the selective call receiver 100 proceeds to step 312 where partial address correlation is performed.

The threshold $T_c$ is directly proportional to a predetermined threshold $T_o$ of an estimated number of address comparisons, and inversely proportional to $N_a$. The number $T_o$ is determined from a number $T_n$ of a weighted average of threshold values indexed by a number n, wherein the number n is an integer. Each value of $T_n$ is determined from a corresponding first probable energy $E_{1_n}$ that would be dissipated by the selective call receiver 100 if it were to use partial address correlation, and a second probable energy $E_2$ that would be dissipated by the selective call receiver 100 if it did not use partial address correlation, wherein $E_{1_n}$ and $E_2$ are made to be substantially equal to each other.

The energy $E_2$ is determined as described in FIG. 6 and is preferably a predetermined constant. The energy $E_{1_n}$, for a particular threshold $T_n$, is determined from the equation $$E_{1_n} = P_{NM_n} * E_{NM} + [1 - P_{NM_n}] * E_{FM},$$

wherein $E_{NM}$ is an energy dissipated by the selective call receiver when no partial address match is found, and wherein $E_{FM}$ is an energy dissipated by the selective call receiver when an address match is found. The energies $E_{NM}$ and $E_{FM}$ are the same energies described in FIGS. 4 and 5, respectively, and are thereby calculated in the same manner.

The number $P_{NM_n}$ is a probability of not finding an address match equal to $$P_{NM_n} = \left( 1 - \left( \frac{1}{2^R} * \sum_{x=0}^{B_e} \left( \frac{R!}{(R-x)! x!} \right) \right) \right)^{N_{c_n} * N_{a_n}},$$

wherein the numbers R and $B_e$ are the same numbers described above. The number $N_{c_n}$ corresponds to an estimated number of address codewords to be processed by the selective call receiver 100, and the number $N_{a_n}$ corresponds to an estimated number of stored addresses in the selective call receiver 100. The numbers $N_{c_n}$ and $N_{a_n}$ are selected in a manner such that one of the two numbers is a fixed number (e.g., $N_{a_n}$) while the other number (e.g., $N_{c_n}$) is adjusted in a manner that makes the energies $E_{1_n}$ and $E_2$ substantially equal to each other. The product of $N_{c_n} * N_{a_n}$ is directly proportional to the threshold $T_n$. Thus, in order to calculate a substantial set of thresholds $T_n$, a corresponding set of products $N_{c_n} * N_{a_n}$ must determined.

For example, assume $E_2$ is a predetermined constant. Let the number $N_{a_1}$ (i.e., n=1, the first sample set) equal to one address codeword. The number $N_{c_1}$ is then adjusted until $E_{1_1}$ (as calculated by the above equations) is approximately equal to $E_2$. In the next sample $N_{a_2}$ is set to two address codewords. As before, $N_{c_2}$ is adjusted until $E_{1_2}$ is approximately equal to $E_2$. This sampling process continues until a large set of products $N_{c_n} * N_{a_n}$, each representing a different set of address comparisons, has been collected. The number $T_o$ is then calculated as a weighted average of these products, e.g., the mean of the products $N_{c_n} * N_{a_n}$.

It will be appreciated that, alternatively, step 402 can be replaced with a look up table step where the selective call receiver 100 is programmed to retrieve the value $T_c$ from the memory 118 of the selective call receiver 100. The value of $T_c$ is preferably programmed during the manufacturing process, or alternatively is programmed into the selective call receiver 100 by the radio communication system using conventional over-the-air programming.

It should be apparent that the second embodiment of FIG. 9 provides the simplest method for applying conditional partial address correlation. Compared to the first embodiment, this method requires the least amount of processing resources and memory space in the control circuitry 110. Although the method is not as accurate as the first embodiment, it is a conservative estimate that encompasses a large group of possible address comparisons (i.e., $N_c * N_a$). More often than not, the selective call receiver 100 will select partial address correlation when the likelihood of energy conservation is high.

The present invention provides a simple and low cost method for applying conditional partial address correlation. In particular, the invention provides two embodiments that can be applied by the selective call receiver 100 for determining when partial address correlation yields better energy conservation over traditional address decoding. Applying either of these embodiments, allows the selective call receiver 100 to take account of the number of selective call addresses stored in the selective call receiver 100, and the number of random bits in the address codewords received from the selective call signal to optimally conserve energy in the application of partial address correlation.

This invention is advantageous to prior art selective call receivers that apply partial address correlation at times when the probability of finding a partial address match is high. The present invention avoids this situation, and asserts partial address correlation only when the probability of finding a partial address match is low, thereby providing a better battery life performance than the prior art selective call receivers.

What is claimed is:

1. In a selective call receiver that uses partial address correlation to decode a portion of a selective call signal transmitted by a radio communication system, a method of implementing partial address correlation so as to reduce energy consumption, comprising:

receiving the portion of the selective call signal from the radio communication system;

determining a first probable energy $E_1$ that would be dissipated by the selective call receiver if it were to use partial address correlation; and using partial address correlation when $E_1$ is less than a second probable energy $E_2$ that would be dissipated by the selective call receiver if it did not use partial address correlation.

2. A method as set forth in claim 1, wherein the selective call receiver includes a number $N_a$ of stored addresses, wherein the portion of the selective call signal includes a predetermined number of address codewords, and further including:

decoding the portion of the selective call signal to determine a number $N_c$ of address codewords included in the selective call signal; and determining $E_1$ based on a probability $P_{NM}$ of not finding a substantial match between one of $N_a$ addresses and one of $N_c$ address codewords.

3. The method as set forth in claim 2, wherein the selective call receiver calculates an energy $E_{NM}$ dissipated by the selective call receiver when no partial address match is found, and an energy $E_{FM}$ dissipated by the selective call receiver when a partial address match is found, and wherein the first probable energy $E_1$ is equal to $$E_1 = P_{NM} * E_{NM} + [1 - P_{NM}] * E_{FM}.$$

4. A method as set forth in claim 2, wherein the selective call receiver makes a number of address comparisons between $N_c$ address codewords and $N_a$ stored addresses, and wherein the probability $P_{NM}$ is based on the number of address comparisons.

5. The method as set forth in claim 4, wherein the selective call receiver calculates a number R of random address bits from the $N_c$ address codewords, and wherein $P_{NM}$ is equal to $$P_{NM} = \left( 1 - \left( \frac{1}{2^R} * \sum_{x=0}^{B_e} \left( \frac{R!}{(R-x)!x!} \right) \right) \right)^{N_c * N_a},$$

wherein $B_e$ is a number of correctable bit errors in the portion of the selective call signal.

6. The method as set forth in claim 1, wherein the selective call receiver calculates $E_2$ from a predetermined constant.

7. The method as set forth in claim 1, wherein the selective call receiver calculates $E_1$ from one of a plurality of predetermined probable energies stored in a memory.

8. In a selective call receiver that uses partial address correlation to decode a portion of a selective call signal transmitted by a radio communication system, a method of implementing partial address correlation so as to reduce energy consumption, comprising:

receiving the portion of the selective call signal from the radio communication system, wherein the portion of the selective call signal includes a predetermined number of address codewords;

decoding the portion of the selective call signal to determine a number $N_c$ of address codewords included in the selective call signal; and using partial address correlation when $N_c$ is less than a predetermined threshold $T_c$ of address comparisons.

9. The method as set forth in claim 8, wherein the selective call receiver includes a number $N_a$ of stored addresses, and wherein $T_c$ is directly proportional to a predetermined threshold $T_o$ of an estimated number of address comparisons, and inversely proportional to $N_a$.

10. The method as set forth in claim 9, wherein $T_o$ is determined from a number $T_n$ of a weighted average of threshold values indexed by a number n, wherein the number n is an integer, wherein each value of $T_n$ is determined from a corresponding first probable energy $E_{1_n}$ that would be dissipated by the selective call receiver if it were to use partial address correlation, and a second probable energy $E_2$ that would be dissipated by the selective call receiver if it did not use partial address correlation, and wherein $E_{1_n}$ and $E_2$ are made to be substantially equal to each other.

11. The method of claim 10, wherein the corresponding first probable energy $E_{1_n}$ is determined from $$E_{1_n} = P_{NM_n} * E_{NM} + [1 - P_{NM_n}] * E_{FM},$$

wherein $E_{NM}$ is an energy dissipated by the selective call receiver when no partial address match is found, wherein $E_{FM}$ is an energy dissipated by the selective call receiver when an address match is found, wherein $P_{NM_n}$ is a probability of not finding an address match equal to $$P_{NM_n} = \left( 1 - \left( \frac{1}{2^R} * \sum_{x=0}^{B_e} \left( \frac{R!}{(R-x)!x!} \right) \right) \right)^{N_{c_n} * N_{a_n}},$$

wherein R is a number of random address bits in the predetermined number of address codewords in the selective call signal, wherein $B_e$ is a number of correctable bit errors in the portion of the selective call signal, wherein $N_{c_n}$ is a number corresponding to an estimated number of address codewords to be processed by the selective call receiver, and wherein $N_{a_n}$ is a number corresponding to an estimated number of stored addresses in the selective call receiver.

12. The method of claim 11, wherein $N_{c_n}$ and $N_{a_n}$ are adjusted such that $E_{1_n}$ and $E_2$ are made to be substantially equal to each other.

13. The method as set forth in claim 11, wherein $T_n$ is proportional to $N_{c_n} * N_{a_n}$.

14. The method as set forth in claim 10, wherein $E_2$ is a predetermined constant.

* * * * *